United States Patent
Chezar et al.

(10) Patent No.: US 6,680,795 B2
(45) Date of Patent: Jan. 20, 2004

(54) UNDERWATER MICROSCOPE SYSTEM

(75) Inventors: Henry Chezar, Palo Alto, CA (US); David Rubin, Santa Cruz, CA (US)

(73) Assignee: The United States of America as represented by the Secretary of the Interior, Washington, DC (US)

(*) Notice: Subject to any disclaimer, the term of this patent is extended or adjusted under 35 U.S.C. 154(b) by 0 days.

(21) Appl. No.: 09/931,182

(22) Filed: Aug. 17, 2001

(65) Prior Publication Data

US 2002/0071174 A1 Jun. 13, 2002

Related U.S. Application Data

(60) Provisional application No. 60/227,014, filed on Aug. 23, 2000.

(51) Int. Cl.[7] .............................................. G02B 21/00
(52) U.S. Cl. ..................... 359/368; 359/363; 73/170.32
(58) Field of Search ................................ 359/363, 368, 359/894, 895, 802–820; D16/204; 73/170.32, 170.33; 175/49; 348/81; 396/25, 28

(56) References Cited

U.S. PATENT DOCUMENTS

| | | | | |
|---|---|---|---|---|
| 2,019,059 A | * | 10/1935 | Sherman | 114/331 |
| 3,619,036 A | * | 11/1971 | Baker | 359/775 |
| 5,129,268 A | * | 7/1992 | Uesugi et al. | 356/335 |
| 5,604,582 A | * | 2/1997 | Rhoads et al. | 356/73 |
| D411,217 S | * | 6/1999 | McBride | 396/25 |
| 6,191,853 B1 | * | 2/2001 | Yamaguchi et al. | 250/575 |
| 6,313,943 B1 | * | 11/2001 | Ikado et al. | 359/363 |

* cited by examiner

Primary Examiner—Mark A. Robinson
Assistant Examiner—Lee Fineman
(74) Attorney, Agent, or Firm—Ross F. Hunt, Jr.

(57) ABSTRACT

An apparatus and a method are provided for capturing and analyzing video images of sediment from the bottom of a body of water such as a river or sea. The apparatus includes a video imager with a close-up focus of lens adapted to collect images of sediment at the bottom of the body of water. A waterproof housing surrounds the video imager. The video images are analyzed using any appropriate algorithm to determine grain size.

20 Claims, 4 Drawing Sheets

UNDERWATER MICROSCOPE SYSTEM

CROSS-REFERENCE TO RELATED APPLICATIONS

This application claims benefit of the filing date of co-pending Provisional Patent Application No. 60/227,014 filed May 23, 2000, the disclosure of which is herein incorporated by reference.

STATEMENT REGARDING FEDERALLY SPONSORED RESEARCH

This invention was made by employees of the United States Government and may be manufactured and used by or for the Government for governmental purposes without the payment of any royalties.

BACKGROUND OF THE INVENTION

1. Field of the Invention

The present invention relates to an apparatus and a method for capturing and analyzing video images and, in particular, video images of sediment grains on a river or seabed, in order to determine grain size.

2. Background of the Invention

Researchers such as sedimentologists, marine geologists, and other scientists are interested in studying the surficial sedimentologic geology in lake, river, and ocean environments. Typically, such a study requires manually collecting samples from the bottom (i.e., bed) of the lake, river, and ocean. Once the sediment has been collected, the collected sediment is analyzed for various characteristics including sediment grain size.

A disadvantage with current techniques used to study surficial sedimentologic geology is that actual sediment samples must be taken from the bottom of the body of water. Typically, the manual collection of sediment tends to be time consuming, costly and dangerous.

BRIEF SUMMARY OF THE INVENTION

In accordance with the present invention, an apparatus and a method are provided for capturing and analyzing video images of river, lake or seabed sediment. Close-up images are taken of the sediment without collecting the sediment from the bottom of the body of water. Subsequently, the captured images are analyzed to determine grain size using a suitable image processing algorithm.

According to one aspect of the present invention, an apparatus is provided for capturing and analyzing video images of river, lake, or sea bed sediment containing grains of various sizes from the bottom of a body of water. The apparatus comprises a video imager, including a flat field close-up focus lens, for collecting images of bed sediment containing different grain sizes. A waterproof housing containing said video imager. A weight member is associated with the housing for ensuring that, in operation, the housing can be lowered down to the bed sediment. A video recorder is provided to record the images collected.

In accordance with another aspect of the present invention, a method is provided for analyzing surficial sediment of the bed of a body of water comprising deploying an imaging device at the bed of the body of water and capturing images of the bed. Next, grain size of the sediment is determined by analyzing individual frames of the images captured.

One feature of the present invention is the ability thereof to determine grain size of the sediment without manually collecting sediment from the bottom of a body of water.

An additional feature of the present invention relates to analyzing images captured from the bottom of a body of water to determine grain size.

Yet another feature of the present invention concerns the provision of a video imaging device specifically adapted to withstand the movement and flow of water current present in a highly dynamic, swiftly moving, river environment, thereby allowing the video imaging device to capture images from the bed.

Further features and advantages of the present invention will be set forth in, or apparent from, the detailed description of preferred embodiments thereof which follows.

DETAILED DESCRIPTION OF THE INVENTION

Figure 1:
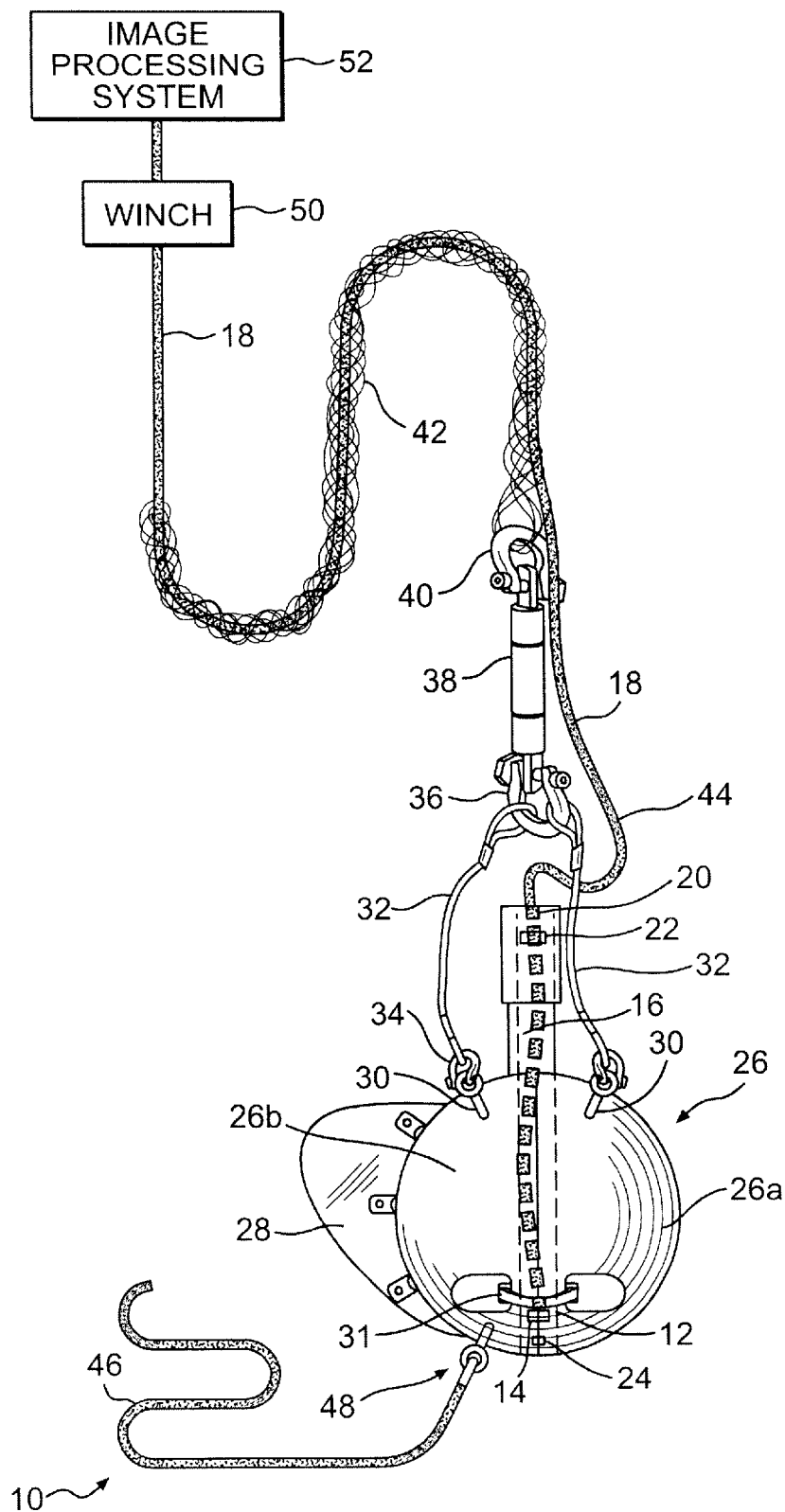
FIG. 1 is an elevational view of an image capturing and analyzing apparatus in accordance with a preferred embodiment of the present invention.

Referring now to the figures, and in particular to FIG. 1, depicted therein is an apparatus 10 for capturing images of sediment grains on the bottom of a body of water such as a river or seabed. The apparatus 10 includes a video imager in the form of a camera 12 (see also FIG. 1(a)). In a preferred embodiment, camera 12 is a modified version of a commercially available camera sold by Deep Sea Power and Light of San Diego, Calif., under the trademark SEESNAKE.

Figure 1A:
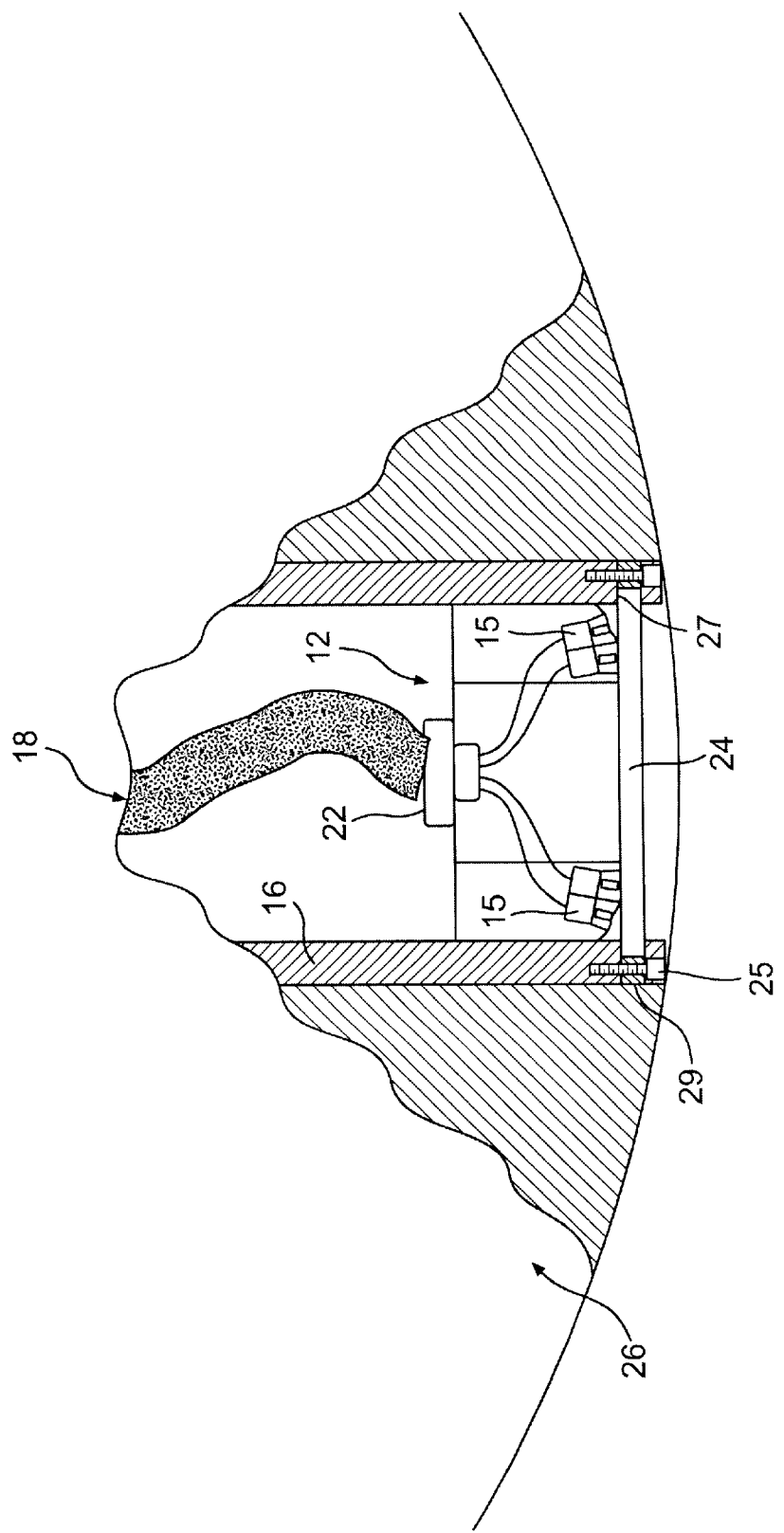
FIG. 1(a) is an enlarged, partial broken-away view of a video imaging device forming a part of the apparatus of FIG. 1.

To better illustrate various features of apparatus 10 involving the camera 12 and associated equipment, a more detailed, partial broken-away view of the apparatus 10 is depicted in FIG. 1(a). The optics of camera 12 have been modified from a wide angle optic having a wide depth of field to a close-up focus lens 14 with a ¼ inch fixed focus to the focal plane of the lens. As a result, lens 14 is capable of approximately ⅜ inch focus edge to edge (i.e. the full horizontal distance across the field of view) which enables video imaging of a seabed at ¼ inch distance from a focal plane of lens 14. A ring light assembly 15 illuminates the river or seabed during image capturing. During operation, camera 12 provides for viewing and capturing microscopic objects as magnified images.

As shown in FIG. 1(a), a stainless steel camera pressure casing front 16 surrounds camera 12 and the remote or distal end of an electrical cable 18 terminates to a bulkhead connector 20 protected by protection collar 22. The pressure casing 16 is sealed at the opposite end (i.e., the optics end) by a plate or front window 24 of a hard transparent material such as Plexiglas.

Plate 24 is bolted to stainless steel camera pressure casing 16 by bolts 25 and further held in place by a retaining ring 29. An O-ring seal 27 provides a seal between plate 24 and the stainless steel casing 16. Plate 24 may be replaced as necessary (where, for example, plate 24 becomes scratched) by removing the bolts 25 from the front window retaining ring 29 and replacing plate 24 with a new plate.

Pressure casing 16 is disposed inside a split steel ball 26 formed by hemisphere 26a, 26b. The steel ball 26 is of sufficient mass and size to withstand the flow of water thereby allowing for deployment of the apparatus 10 to the bottom of a body of water as well as for capturing images of the sediment bed. As will be apparent to one of ordinary skill in the art, the size and mass of the steel ball 26 can vary depending on the conditions upon which the apparatus 10 is deployed. In a specific non-limiting example, the steel ball 26 is a 12 inch outer diameter 100 pound steel ball.

The steel ball 26 is precisely machined to enable clamping both hemispheres 26a, 26b tightly to the tubular shaped stainless steel camera pressure casing 16 using e.g., ¾ inch bolts 31 so that the pressure casing 16 extends through the middle of the stainless steel ball 26. The front window or plate 24 is disposed slightly inside the outside radius of the sphere of steel ball 26 to protect the plate 24 from hard river bottom impacts. Camera 12 is positioned in a vertical downward position when the apparatus 10 is employed for image capturing.

A stabilizer fin 28 is a vane mounted to the exterior surface of the steel ball 26 and extends horizontally outward from a midline of the steel ball 26. The stabilizer fin 28 functions to direct the steel ball 26 in the current of flowing water once the steel ball 26 is deployed.

Four eyebolts (only two of which, denoted 30, are shown in FIG. 1) are threaded into the steel ball 26. A bridle element of a four-point stainless steel bridle 32 is attached to each of the eyebolts 30 via a respective attachment shackle 34. The four-point stainless steel bridle 32 is connected to a single lift point, formed by a connecting shackle 36, which, in turn, is attached to a swivel assembly 38. On the opposite end of swivel assembly 38, a connecting shackle 40 is attached to yale-grip element or sheath 42.

The yale-grip element 42 provides a stress reduction-type sheath around electrical cable 18. Further, the yale-grip element 42 serves to protect the electrical cable 18 from undo strain by mechanically spreading the tension points along the length of the yale-grip sheath covered portion of electrical cable 18. Thus, if for example, the yale-grip sheath extends five feet along electrical cable 18, then there tension points will be spread along that five-foot section of electrical cable 18.

The apparatus 10 includes various safety features including a small loop 44 in electrical cable 18 is located between shackle 40 and protective collar 22 to prevent the electrical cable 18 from becoming too taunt. In addition, a safety line 46 is tied to eyebolt 48 to be used to retrieve the steel ball 26 if the primary lift point at shackle 36 fails.

The electrical cable 18 is wound through a winch, indicated by block 50, which functions to lower and raise the steel ball 26 from a surface vessel to the riverbed. Cable 18 terminates at an image processing system, indicated by block 52.

Figure 2:
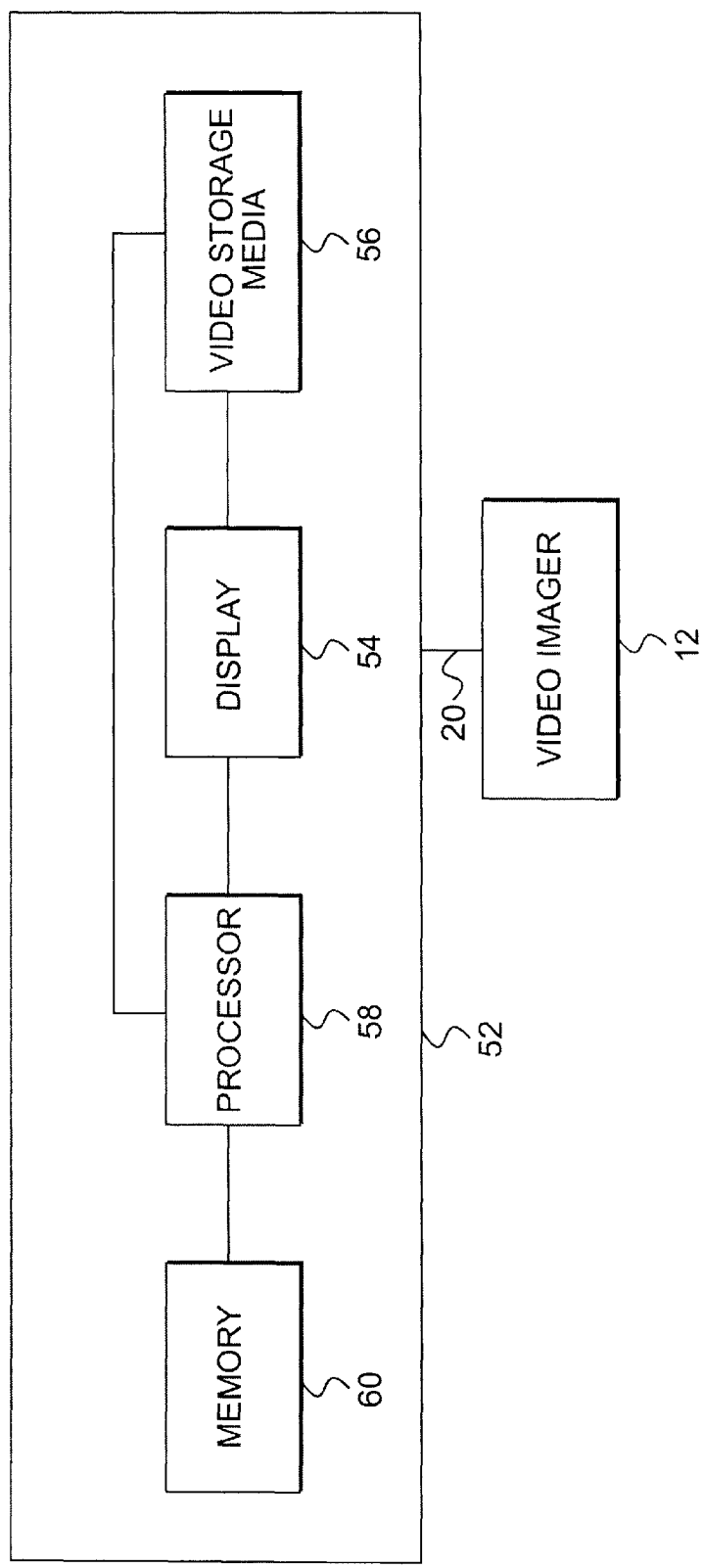
FIG. 2 is a highly schematic block diagram of the image recording, processing and display portion of the preferred embodiment of FIG. 1.

Referring now to FIG. 2, the basic components of image processing system 52 are depicted in a highly schematic block diagram. Video images of the bottom of a riverbed may be viewed continuously on display 54 and recorded via digital video recorder 56. While viewing the images, the best individual frames are saved and stored in memory 60 such as a hard drive or RAM, or digital video recorder 56.

Processor 58 analyzes the individually image frames using an appropriate algorithm to identifying sediment grain size. Processor 58 may also execute image processing software to enhance and/or magnify the captured images. Processor 58 can be located remotely from the video imager 12 for use to process recorded images at a later time and at a different location (e.g. a research lab).

During operation of the present invention, camera 12 (disposed the inside stainless steel camera pressure casing 16 and ballasted by the steel ball 26) is lowered over the side of a boat or other vessel using winch 50, until the steel ball 26 impacts the riverbed at a first sample station. The steel ball 26 is held steady until the video image, monitored on the display 54, shows the sediment to be flush to the exterior surface of window 24 and the video image appears to be motionless. At this point, a first video image sample is complete, and the apparatus 10 is moved to the next sample station. This process is repeated until an entire field operation is completed.

Once all of the stations are complete, the video images are then digitally processed off-site within a research lab. Optimally, video images are captured using video-editing software at thirty frames per second from digital video recorder 56 and then stored in memory 60. The best individual frames of the video are chosen which optimally include images taken when the camera 12 is motionless in the riverbed sediment. These images are then saved as raw data files and may be analyzed by one of any appropriate image processing algorithms described in further detail below.

Alternatively, rather than processing video images off-site, individual frames may be captured and digitally processed as the images are recorded or subsequently, by a processor located on board the boat or vessel.

One algorithm for image processing employs a spatial autocorrelation function. This algorithm operates under the theory that if the grains are large, then nearby pixels in an image will have similar intensity, whereas, if the grains are small, adjacent pixels will have little correlation in intensity. For example, the autocorrelation between an original image and an image shifted by two pixels provides for a good determination of actual grain size. However, a more coarse, yet still acceptable autocorrelation can be achieved using an image shifted by 5 pixels.

Figure 3:
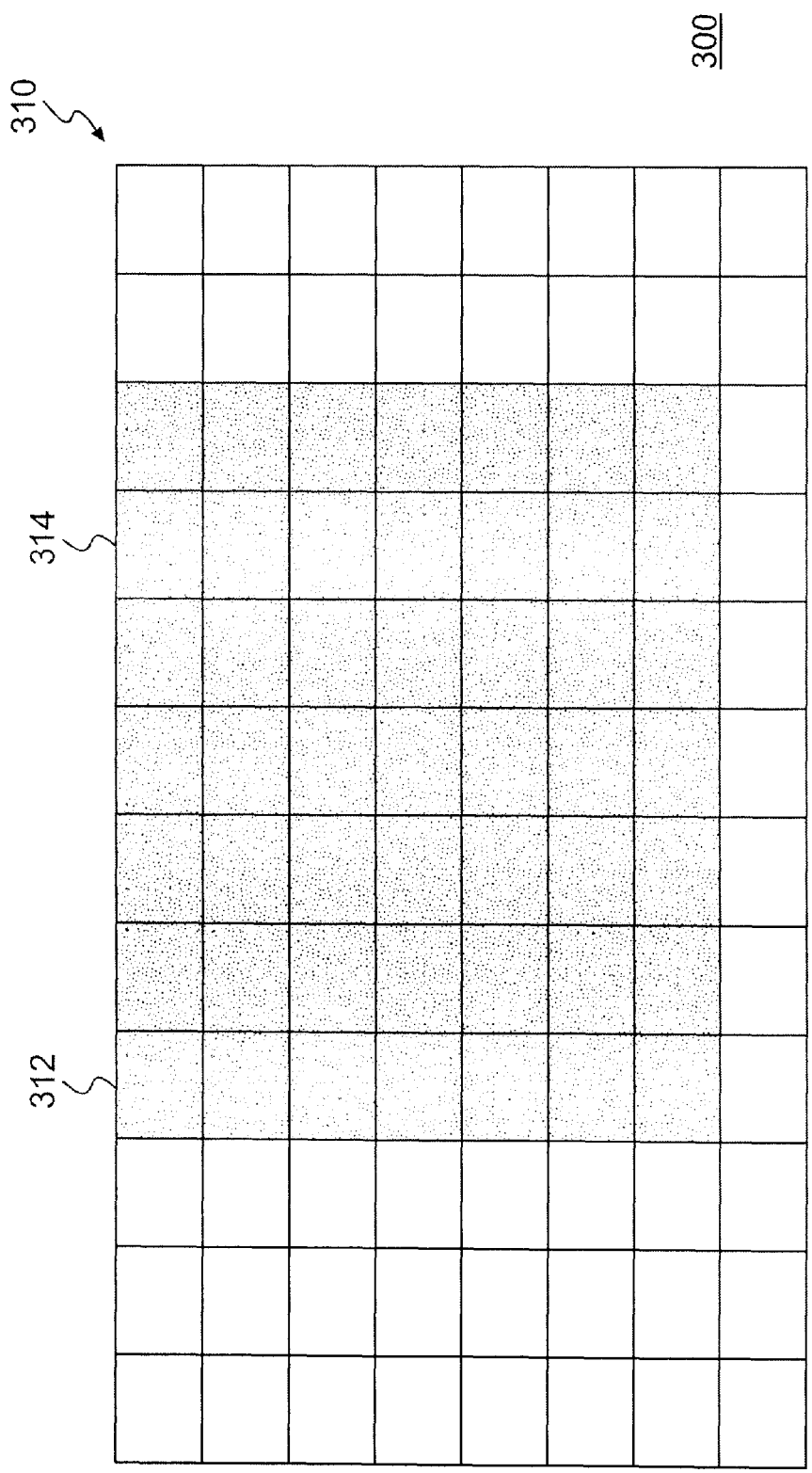
FIG. 3 shows a simplified pixel image array of a captured image according to the present invention.

To further facilitate understanding of the autocorrelation algorithm for determining grain size of the present invention, reference is made to FIG. 3 which depicts a simplified exemplar image 300 composed of a pixel array 310. The first step in implementing the autocorrelation algorithm is a calibration process to correlate various known grain sizes to respective autocorrelation values. One calibration technique may include sieving sand to obtain five samples of known grain size spanning a range of sand sizes (2.0 mm, 0.5 mm, 0.25 mm, 0.125 mm, and 0.0625 mm). The camera 12 is then used to obtain images of these known samples which includes image 300. Each image is converted into an array of numbers, each number representing the intensity (brightness) of a pixel of the image. The intensity of each pixel in each image is compared with the intensity of a pixel offset by a distance of five pixels in the respective image. For example, in image 300, the intensity of pixel 312 is compared to the intensity of a pixel offset by a distance of five pixels, namely pixel 314.

Autocorrelation values are determined for each of the five images, as the average intensity difference between original and offset pixels. As will be apparent to one of ordinary skill in the art, in images of large grains, there will tend to be a relatively small difference in the intensity of pixels separated by a distance of five pixels whereas, in images of small grains, there will tend to be relatively large difference in pixel intensity.

Next, a linear equation is derived that quantifies the grain size of the five calibration samples as a function of their autocorrelation value. As should be apparent to one of ordinary skill in the art, grain size in an image is proportional to the value of the autocorrelation in the image.

Grain size determination of an unknown sample is provided by first calculating an autocorrelation value of an image captured from the riverbed by comparing the original pixels to an offset pixel using the same technique as described above in the calibration process. The calculated autocorrelation value for the unknown sample image is then correlated to grain size using the calibration equation derived during the calibration process.

As alternatives to using the autocorrelation algorithm described above, other candidate algorithms may be employed in the present invention for determining grain size from digital images. One such approach includes a two-dimensional FFT (fast Fourier transform). The fast Fourier transform, as will be apparent to one of ordinary skill in the art, is similar to the method used to measure the period of events in a time series but can be adapted to a two-dimensional version, thereby providing a method for measuring the size of objects in an image.

Another approach to determine grain size is to recognize individual grains by viewing their sizes. One disadvantage with this technique is that it tends to be more complex since grains on the top layer partially obscure underlying grains thereby making the underlying grains appear smaller than they actually are.

An additional alternative algorithm that can be used is an edge-detection algorithm for measuring the total length of all grain edges within an image. The fatal length increases as the average grain size goes down.

Yet another algorithm that can be used involves evaluating wavelets to measure grain size.

The present invention offers important features and advantages not found in the prior art and provides for underwater video imaging and sediment grain size determination without having to collect samples from the bottom of the bed. These features include providing an underwater lens capable of ¼ inch focus to the focal plane of the lens and a unique housing and ballasting construction which includes a heavy (e.g., 100 pound) steel ball 26 with fitted pressure case 16 and directional vane 28. In addition, the image processing software allows analysis of the microscope images. The Plexiglas window or plate 24 provides for an unobstructed, clear view of the riverbed by directly touching (i.e., contacting) the sand grains, thereby limiting or eliminating any obstruction of the view that would be created by cloudy water generated when steel ball 26 impacts the riverbed.

Further features of the present invention include the ability to obtain magnified images riverbed sediment by either the optics of camera 12 such as lens 14 or by image processing by processor 58. Alternatively, both the optics and processor 58 may be used in concert with one another to provide a sharp, magnified image of the riverbed.

Although the invention has been described above in relation to preferred embodiments thereof, it will be understood by those skilled in the art that variations and modifications can be effected in these preferred embodiments without departing from the scope and spirit of the invention.

What is claimed:

1. An apparatus for capturing and analyzing video images of river, lake, or sea bed sediment containing grains of various sizes from the bottom of a body of water, said apparatus comprising:

a video imager, including a flat field close-up focus lens, for collecting images of bed sediment containing different grain sizes;

a waterproof housing containing said video imager;

a viewing window, disposed in a bottom exterior portion of said housing in alignment with said video imager, for, in operation, contacting the surface of the bed sediment so said video imager can capture images of the surface of the bed sediment;

a weight member associated with said housing for ensuring that, in operation, said housing can be lowered down so as to rest on the bed sediment and permit the viewing window to contact the surface of the bed sediment;

a video recorder for storing the images collected; and a processor for analyzing the images collected by said video imager to determine grain size of the bed sediment of the surface thereof.

2. The apparatus of claim 1, wherein said processor processes said images to produce magnified images.

3. The apparatus of claim 1, wherein said processor is remote from said video imager.

4. The apparatus of claim 1, wherein said processor determines grain size based on a calculation of an autocorrelation value of the image derived by comparing intensity of each pixel forming the image with a respective offset pixel intensity and a correlation of the autocorrelation value with grain size using a calibration equation.

5. The apparatus of claim 1, wherein said processor determines grain size by using one of a two-dimensional Fourier transform, wavelets, and edge detection.

6. The apparatus of claim 1, wherein said lens provides a ¼ inch fixed focus in the middle of the field.

7. The apparatus of claim 1 wherein said video imager comprises a digital video imager and the images comprise digital images comprised of pixels.

8. The apparatus of claim 1, wherein said lens provides magnified images.

9. The apparatus of claim 1, wherein said window comprises a replaceable transparent window.

10. The apparatus of claim 1, further comprising a video console for displaying the images.

11. The apparatus of claim 1, wherein said weight member comprises an exterior shell surrounding the housing.

12. The apparatus of claim 11, wherein said exterior shell comprises a steel ball.

13. The apparatus of claim 11, further comprising a stabilizer fin extending horizontally from an outer surface of said exterior shell to stabilize the shell against the flow of a body of water.

14. The apparatus of claim 11, further comprising a cable assembly attached to said exterior shell for lowering down to, and raising said exterior shell up from, the bed sediment.

15. A method for analyzing surficial sediment of the bed of a body of water, said method comprising the steps of:

deploying a housing, including a viewing window in a bottom exterior portion thereof and a video imaging device, comprising a flat field close-up focus lens, on the surface of the sediment of the bed of the body of water so that the viewing window contacts the surface of the sediment of the bed and an image of the surface of the sediment of the bed can be obtained through the window;

capturing images of the surface of the sediment of the bed using said video imaging device; and determining grain size of the sediment at the surface thereof by analyzing the images.

16. The method of claim 15, wherein said step of deploying an imaging device comprises initially impacting the bed with the imaging device.

17. The method of claim 15, wherein said step of determining grain size comprises using one of a two-dimensional Fourier transform, wavelets, and edge detection algorithm.

18. The method of claim 15, wherein said step of capturing images of the sediment comprises capturing images when the sediment and the imaging device are motionless with respect to each other.

19. The method of claim 15, wherein said step of capturing images of the sediment of the bed comprises producing digital images composed of pixels.

20. The method of claim 19, wherein said step of determining grain size of the sediment comprises:

calculating an autocorrelation value of the image by comparing an intensity value for each pixel with a respective offset pixel intensity; and correlating the autocorrelation value with a grain size using a calibration equation.

* * * * *